United States Patent [19]
Chenault et al.

[11] 3,852,589
[45] Dec. 3, 1974

[54] READER FOR RADIOTHERMOLUMINESCENT DOSIMETER

[75] Inventors: Roger Chenault, Boulogne; Raymond Prigent, Gif-sur-Yvette, both of France

[73] Assignee: Commissariat A L'Energie Atomique, Paris, France

[22] Filed: Dec. 1, 1970

[21] Appl. No.: 94,074

[30] Foreign Application Priority Data
Dec. 5, 1969   France .......................... 69.42147

[52] U.S. Cl. .......... 250/71.5 R, 250/71 R, 250/83 R
[51] Int. Cl. ............................ G01t 1/11, G01t 1/20
[58] Field of Search .......................... 250/71.5 R, 71

[56] References Cited
UNITED STATES PATENTS
3,487,209   12/1969   Perry ........................... 250/71.5 R
3,497,671   2/1970    Schayes ........................ 250/71 R
3,600,583   8/1971    Paynter ........................ 250/71.5 R
3,610,926   10/1971   Kastner ........................ 250/71.5 R
3,569,702   3/1971    Schayes ........................ 250/83 R

*Primary Examiner*—John S. Heyman
*Attorney*—Lane, Aitken, Dunner & Ziems

[57] ABSTRACT

The reader comprises a photomultiplier and three operational amplifiers connected in cascade. The first amplifier provides the glow curve. The second amplifier may operate either as an integrator or as a second linear amplification stage. The third amplifier provides the peak value of the luminescence curve.

4 Claims, 1 Drawing Figure

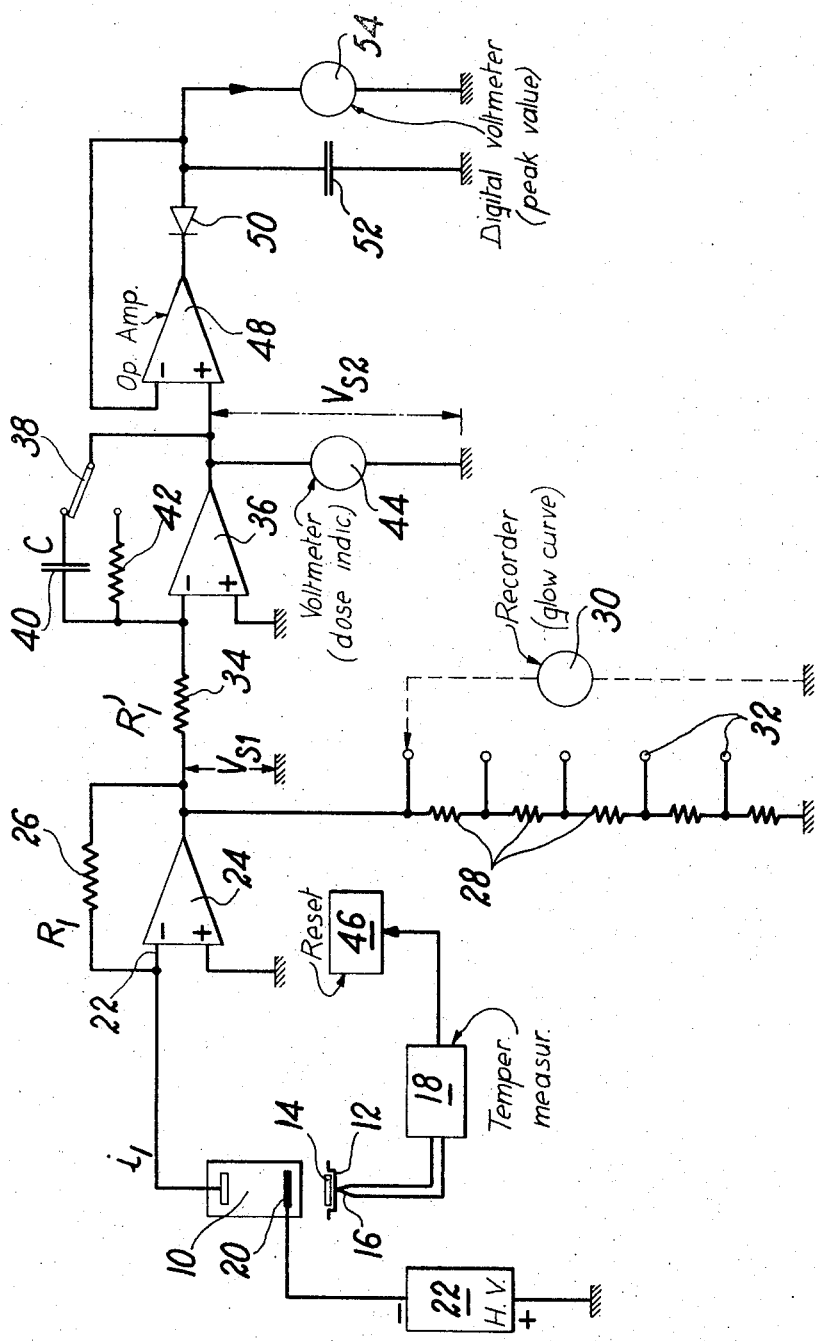

READER FOR RADIOTHERMOLUMINESCENT DOSIMETER

BACKGROUND OF THE INVENTION

This invention relates to a device for measurement of radiation dose recorded by a radiothermoluminescent dosimeter. Dosimeters of this type utilize the property of various substances such as activated lithium fluoride and calcium fluoride of storing part of the energy which they receive in the form of ionizing radiations and of restoring it in the form of light energy when they are heated to a sufficiently high temperature. In general, a radiothermoluminescent dosimeter is in the form of a pellet, a strip or a small bag which contains the sensitive substance in various forms (sintered powder, powder coated with transparent plastic material, divided powder).

In order to determine the radiation dose received by the dosimeter, the latter is placed in a reading device comprising an element for heating the dosimeter in accordance with a reproducible law which is adapted to the sensitive substance and the light emission of the dosimeter is then measured.

The reading device must take into account a certain number of related phenomena and provide information which is representative of the absorbed radiation dose with the maximum degree of accuracy. The majority of devices which are presently in existence are designed to integrate the light emission in a given temperature range or in other words to deliver a signal which is proportional to the area under the light emission curve between a lower value of temperature (so determined as to exclude the thermoluminescence peaks which are subject to fading) and a higher value (which is chosen in order to eliminate the light emission arising from phenomena other than radiothermoluminescence and especially triboluminescence).

There also exist reading devices which can provide either integrated light emission or a plot of the curve of variation of the light emission as a function of time but not both at once : for this purpose, the photomultiplier which serves to detect the light emission is coupled with either of two measuring circuits.

The aim of the invention is to provide a device for reading a radiothermoluminescent dosimeter which meets practical requirements more effectively than those which were employed in the prior art, especially insofar as the device supplies simultaneously:

on the one hand the glow curve, that is to say a plot of the variation in light intensity as a function of time and therefore of temperature;

on the other hand either the light emission (that is to say in other words the area of light integration as a function of time) which provides an indication of the dose, or the peak value of the emission (that is to say the maximum intensity of the light radiation or the maximum value of the spectrum).

It is thus apparent that there is obtained in this case on the one hand a value which is considered significant, which can be utilized immediately and which is constituted by the integrated emission between two temperatures in the general case or alternatively the peak value in the event that the spectrum always has the same shape and that this value is significant and, on the other hand, a plot of the spectrum to which reference can be made if necessary in order to find either of the two above-mentioned values (the original information having been destroyed by the reading).

A better understanding of the invention will be obtained from the following description of a reading device which constitutes one exemplified embodiment of the invention. Reference is made to the single accompanying FIGURE in which is shown a block diagram representing the amplifying and measuring chain of the device and the ancillary elements.

The reading device which is illustrated comprises a photomultiplier 10 which is placed opposite to a cup 12 for accommodating a radiothermoluminescent dosimeter 14. The cup 12 is fitted with heating means which are not illustrated. A thermocouple 16 associated with a measuring circuit 18 serves to follow the temperature variations of the cup and of the dosimeter. The photocathode 20 of the photomultiplier is brought to an adjustable high voltage by means of a direct-current source 22.

The output anode of the photomultiplier 10 is coupled to one of the inputs 22 of an operational amplifier 24, the other input of which is connected to ground (earth). As is generally known, the term "operational amplifier" designates a high-stability direct-coupled amplifier having very high gain and input impedance (the gain being several thousand and the input impedance usually exceeding $10^{10}$ ohms).

The operational amplifier 24 is coupled in a loop with a resistor 26 having a value $R_1$ and the output of said amplifier is connected to ground through a resistance chain 28 which constitutes a dividing bridge. A voltmeter 30 which can be of the recording type serves to measure either the output voltage $V_{s1}$ of the first amplifier 24 relative to ground (namely the circuit arrangement shown in the FIGURE) or a fraction of said voltage by mounting said voltmeter between ground and one of the intermediate terminals 32.

The operational amplifier 24 which is connected in a loop with its resistor 26 having a value $R_1$ delivers an output voltage $V_1$ which is coupled with the input current $i_1$ provided by the photomultiplier 10 by the approximate relation:

$$V_{s1} = R_1 \cdot i_1$$

The output voltage $V_{s1}$ remains proportional to the current delivered by the photomultiplier (that is to say as long as the variation is not extremely fast). Thus, recording of the voltage $V_{s1}$ as a function of time provides the emission spectrum if the current intensity $i_1$ is in turn proportional to this emission. In point of fact, there is added to the useful current the shot noise of the photomultiplier (dark current) which should be deducted in the event of measurement of small doses.

The output of the first operational amplifier 24 drives through a resistor 34 having the value $R'_1$ a second operational amplifier 36 which is mounted as a differential amplifier (the second input being connected to ground). Said second amplifier 36 can be coupled in a loop by means of a switch 38 either with a capacitor 40 having a capacitance C (connection as an integrator) or with a resistor 42.

In the second case, the assembly of operational amplifiers 24 and 36 evidently delivers an output voltage which follows the variations in time of the current intensity $i_1$ in the same manner as the voltage $V_{s1}$. On the other hand, when the amplifier 36 is coupled in a loop with the capacitor 40, its output voltage $V_{s2}$ is evidently a different function of $i_1$.

As a first approximation, it is possible to assimilate the variation in time of the current intensity $i_1$ with a linear function, that is to say if the law of variation in time of the temperature of the radiothermoluminescent dosimeter is suitable. This condition is largely satisfied especially if the heating device is of the type described in French Pat. No. 1,569,117.

In this case, the temperature variation of the radio-thermoluminescent dosimeter is substantially linear within the temperature range in which the emission is to be measured. In this case alone and provided that the integration time T is distinctly smaller than the product $R'_1 \cdot C \cdot A$ (A being the open-loop gain of the second amplifier 36), we find:

$$V_{s2} \approx (R_1 I_o T)/(2C R'_1)$$

In this formula, $I_o$ designates the value attained by the current intensity $i_1$ at the end of the time $T$. By modifying the value of the adjustable resistance $R'_1$, the coefficient of proportionality can be adjusted with accuracy.

There is therefore obtained simultaneously a first output voltage $V_{s1}$ which is representative at each instant of the light emission at said instant and a second voltage $V_{s2}$ which is proportional to $I_o$ and to the integration time $T$ which is therefore representative of the emission integral. The output voltage $V_{s2}$ is measured by means of a voltmeter 44. A reset device 46 controlled by the temperature-measuring circuit 18 automatically discharges the capacitor 40 through a temporary short-circuit which is not illustrated and resets the voltmeter 44 to zero when the temperature of the dosimeter which is being heated reaches the value corresponding to the beginning of integration of the emission.

The output of the second operational amplifier 36 is coupled to one of the inputs of a third operational amplifier 48 which is mounted as a non-reversing amplifier. There is associated with the amplifier 48 a total feedback loop comprising a diode 50 which is mounted in reverse in the case of the FIGURE in which the input voltage is negative and couples the output with the second input of the amplifier. A capacitor 52 for storing the peak voltage and a high-impedance digital voltmeter 54 (vacuum-tube voltmeter, for example) are connected in parallel between a point of the loop which is located downstream of the diode 50 and ground. The reset circuit 46 effects the discharge of the capacitor 52 through a short-circuit at the same time as the discharge of the capacitor 40.

The design principle of the third operational amplifier 48 is such that it constitutes a peak detector consisting of a diode which charges a storage capacitor : since the voltage $V_{s2}$ is negative as long as its absolute value increases, the diode is conductive and the capacitor is charged. When the input voltage decreases, the potential of the capacitor plate which is not connected to ground becomes more negative than the output voltage and the diode is reverse-biased. Since the back resistance of said diode is of high value, the capacitor remains charged under the maximum upstream voltage. The presence of the operational amplifier removes the disadvantage of a circuit which is not provided with one and permits its use in respect of low input voltages of the same order of magnitude as the threshold voltage of the diode. Below said threshold voltage (0.2 V in the case of a germanium diode and 0.7 V in the case of a silicon diode), the forward resistance of the diode is of high value and the capacitor would charge at only a slow rate when provision is not made for an amplifier. In fact, the voltage available without an operational amplifier can be a few millivolts when the dosimeter has received only small doses.

A simple calculation shows that the threshold voltage of the diode is divided in practice by the gain A of the operational amplifier 48 in an open loop. In other words, the addition of the amplifier 48 virtually consists in dividing the threshold voltage of the diode by a high factor (usually of the order of 10,000). Under these conditions, it is possible to adopt a capacitor 52 having a high value of capacitance which nevertheless charges at a fast rate and ensures the maintenance of a correct indication on the voltmeter 54, that is to say if said voltmeter has a sufficiently high impedance.

A device has been constructed for measuring the dose received by activated lithium fluoride dosimeters. The resistance bridge 28 was designed to provide seven ranges of measurement from 0–100 mRad to 0–100 Rad. A panel-type digital voltmeter having an input resistance of 200 megohms supplied the peak value until the capacitor 52 was short-circuited.

We claim:

1. A device for reading a radiothermoluminescent dosimeter comprising : means for heating the dosimeter in accordance with a predetermined law ; a transducer sensitive to the light emission of the dosimeter and delivering an electric current proportional to the light ; and amplifying and measuring means, wherein said means comprise a first operational linear amplifier, a recorder for the voltage delivered by said first amplifier, a second operational amplifier, manually operable means for closing a loop including said second amplifier either on an integration capacitor or on a high value resistance, a voltmeter for measuring the output voltage of said second amplifier, said voltmeter providing the integrated light emission at the end of the heating period when said second amplifier is closed on said capacitor, a third operational amplifier, a loop associated with said third operational amplifier and comprising rectifier means, and voltage measuring means for measuring the output voltage of said diode, said first, second and third amplifiers being connected in cascade.

2. A reading device according to claim 1 comprising a storage capacitor connected in parallel with said voltage measuring means for storing the peak value of said light emission.

3. A reading device according to claim 2 comprising reset switches for discharge the loop capacitor of the second operational amplifier and the storage capacitor before detection of the useful portion of the light emission.

4. A reading device according to claim 1, wherein the means for heating the dosimeter are programmed for linear temperature rise.

* * * * *